Patented May 23, 1933

1,910,818

UNITED STATES PATENT OFFICE

HANNS UFER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PRODUCTION OF ETHYL ACETATE

No Drawing. Application filed July 30, 1931, Serial No. 554,073, and in Germany August 14, 1930.

The present invention relates to the production of ethyl acetate.

In the manufacture and production of ethyl acetate, it has already been the practice to incorporate a solution of ethylene in concentrated sulphuric acid with an amount of glacial acetic acid which is at least equimolecular to the amount of ethylene therein, the ester formed after prolonged heating being then distilled off, preferably in vacuo, with the addition of water.

This process, however, furnishes yields of only 70 to 80 per cent even if the ester be distilled over in vacuo. The production of the ester is therefore a cumbrous and expensive operation, and the distillate always contains considerable amounts of acetic acid. Large quantities of acetic acid also are still present in the residual sulphuric acid, because even when the major portion of the ester has distilled over, a partial saponification of the ester first formed occurs again during the distillation owing to the water present.

I have now found that the said objections are overcome and that very good yields of ethyl acetate are obtained in a simple manner by acting on "ethyl sulphuric acid", obtainable by introducing ethylene into concentrated sulphuric acid, with acetic acid and water, provided that the amount of water added to the ethyl sulphuric acid is kept so low that the esterification of the acetic acid proceeds as far as possible but so high that the ester can distil over as a ternary mixture of ester, alcohol and water.

The ternary mixture having the lowest boiling point consists of about 83 per cent of ester, 8 to 9 per cent of water and 9 to 8 per cent of ethyl alcohol. The boiling point of this mixture lies between 70° and 71° C. at 760 millimeters of mecury and is therefore substantially below that of ethyl acetate, water and acetic acid, and lower than that of ethyl alcohol. In order to effect practically complete esterification and to enable the said ternary mixture to be distilled over continuously, it is necessary, inasmuch as alcohol and water pass over concurrently with the ester, that the amount of acetic acid added should always be less than that theoretically required for the interaction between ethyl sulphuric acid and acetic acid. As a rule, the amount of acetic acid to be added is between 70 and 90 per cent of that which is equivalent to the ethylene present, and the amount of water to be added is between 50 and 80 per cent of the weight of the ethyl sulphuric acid employed. If an insufficient quantity of water be present in the distillation mixture a distillate rich in alcohol passes over and a corresponding portion of acetic acid remains non-esterified. If a too high quantity of water be present, the tenary mixture of ester, alcohol and water passes over at first, but in a later stage a distillate is obtained which contains increasing quantities of alcohol, water and acetic acid owing to the saponification of the ester and impossibility of the regeneration of the latter in the presence of large quantities of water. The quantities of acetic acid and water to be added to a given amount of ethyl sulphuric acid are therefore restricted within fairly narrow limits, if the added acetic acid is to be converted in a practically complete manner, and the ester is to be distilled off direct as a ternary mixture with water and ethyl alcohol. The yield of ester rises with the composition of the distillation mixture being the nearer to that of the ternary mixture, the content of ester in the distillate rising simultaneously with a decrease in the content of free acetic acid. The distillation is preferably effected with the aid of a fractionating column.

In contrast to the process already known in which it is first necessary to effect a conversion of acetic acid and ethyl sulphuric acid, it is possible, according to the present invention, to add to the ethyl sulphuric acid, first the water and then the acetic acid or else a diluted acetic acid. Owing to the considerable rise in temperature occurring according to this process, a very good yield of ester is obtained, even when the ethyl sulphuric acid contains large amounts of diethylsulphate, without any prolonged heating being required prior to the distillation of the ester.

This process makes it possible to recover directly up to about 97 per cent of the added acetic acid, as ester.

That portion of the ethylene which is converted into ethyl alcohol and contained as alcohol in the ternary mixture, and also the water, can be used again, after separation from the distillate, in the treatment of further quantities of ethyl sulphuric acid, so that the ethylene originally present in the form of ethyl sulphuric acid is consumed for esterification if the corresponding quantities of acetic acid be added. The distillation is preferably continued after the passing over of the ternary mixture, and the portions coming over at higher temperatures, as for example 75° to 100° C., and containing the remainder of the alcohol and acetic acid, in addition to water and a little ester, are collected separately and employed direct for treating further amounts of ethyl sulphuric acid. The amounts of water and acetic acid to be employed in such cases must then be correspondingly modified. In this manner the alcohol formed in the first esterification step from the ethylene dissolved in the sulphuric acid is converted into ester on working further quantities of ethyl sulphuric acid, so that a yield of 97 per cent of the theoretical yield calculated on ethylene in the sulphuric acid is finally obtained.

If the sulphuric acid liberated in the process is to be worked up into ammonium sulphate, ammonia can also be added in a quantity lower than that corresponding to that of the sulhpric acid present in the form of ethyl sulphuric acid to the ethyl sulphuric acid with the water and acetic acid.

By the process according to the present invention in which the known phenomenon of azeotropy is employed, a remarkably favorable yield of ethyl acetate is obtained, a result which could not be attained by the processes previously known.

The following example will further illustrate the nature of this invention, but the invention is not restricted to this example. The parts are by weight.

*Example*

1000 parts of ethyl sulphuric acid, prepared by absorbing at about 70° C. ethylene in sulphuric acid of 96 per cent strength, and containing 209 parts of ethylene, are incorporated with 700 parts of water and 335 parts of glacial acetic acid of 96 per cent strength. The mixture is then distilled in a fractionating column at such a velocity that the bulk of the ester passes over at from 70° to 71° C. in the form of the ternary mixture. The distillate passing over up to 76° C. consists of 82 to 83 per cent of ester, about 9 per cent of ethyl alcohol, about 8 per cent of water and contains only a few tenths per cent free acetic acid. With reference to the amount of acetic acid employed, the yield of ester in the distillate corresponds to from 87 to 94 per cent of the theoretical yield depending on the nature of the column and on the velocity of distillation.

Distillation is then continued, up to about 95° to 100° C., and the resulting distillate is preferably employed direct for working further quantities of ethyl sulphuric acid. Including the amount of distillates obtained between 76° and 100° C., the total yield of ester corresponds to from 93 to 97 per cent of the acetic acid employed.

What I claim is:

1. In the production of ethyl acetate by heating ethyl sulphuric acid with acetic acid and distilling off the ester formed, the step which comprises carrying out the reaction with acetic acid in a quantity of from 70 to 90 per cent of that amount which is equivalent to the quantity of the ethylene in said ethyl sulphuric acid and in the presence of a quantity of water, insufficient for substantial saponification of the ester formed but sufficiently high for the formation of a ternary mixture of ester, alcohol and water.

2. The process for the production of ethyl acetate which comprises acting on ethyl sulphuric acid with acetic acid in a quantity of from 70 to 90 per cent of that amount which is equivalent to the amount of the ethylene in said ethyl sulphuric acid, and with water in a quantity of from 50 to 80 per cent by weight of the ethyl sulphuric acid employed, while distilling off a ternary mixture of ester, alcohol and water.

3. The process for the production of ethyl acetate which comprises acting on ethyl sulphuric acid with acetic acid in a quantity of from 70 to 90 per cent of that amount which is equivalent to the amount of the ethylene in said ethyl sulphuric acid, and with water in a quantity of from 50 to 80 per cent by weight of the ethyl sulphuric acid employed, while distilling off a ternary mixture of ester, alcohol and water, separating the ester from alcohol and water and reacting with the resulting mixture consisting mainly of alcohol and water on ethyl sulphuric acid and acetic acid, while taking care that a quantity of water, insufficient for substantial saponification of the ester formed but sufficiently high for the formation of a ternary mixture of ester, alcohol and water is present.

4. The process for the production of ethyl acetate which comprises subjecting to fractional distillation a mixture of about 1000 parts of ethyl sulphuric acid, about 700 parts of water and about 335 parts of glacial acetic acid at from 70° to 76° C., raising the temperature to about from 95° to 100° C. and subjecting the second distillate to fractional distillation with ethyl sulphuric acid and glacial acetic acid.

5. The process for the production of ethyl acetate which comprises subjecting to fractional distillation a mixture of about 1000 parts of ethyl sulphuric acid, about 700 parts of water and about 335 parts of glacial acetic acid at from 70° to 76° C., raising the temperature to about from 95° to 100° C., separating ethyl acetate from the second distillate and subjecting the latter to fractional distillation with ethyl sulphuric acid and glacial acetic acid.

6. The process for the production of ethyl acetate which comprises acting on ethyl sulphuric acid with acetic acid in a quantity of from 70 to 90 per cent of that amount which is equivalent to the quantity of the ethylene in said ethyl sulphuric acid, and with water in a quantity of from 50 to 80 per cent by weight of the ethyl sulphuric acid employed, while subjecting the mixture to the action of heat sufficient to distill off the bulk of the reaction mixture as a ternary mixture of ester, alcohol and water at a temperature of from 70 to 76° C.

In testimony whereof I have hereunto set my hand.

HANNS UFER.